United States Patent [19]
Maeda

[11] Patent Number: 5,343,456
[45] Date of Patent: Aug. 30, 1994

[54] DIGITAL AUDIO SIGNAL REPRODUCING APPARATUS

[75] Inventor: Yasuaki Maeda, Tokyo, Japan
[73] Assignee: Sony Corporation, Japan
[21] Appl. No.: 887,174
[22] Filed: May 21, 1992

[30] Foreign Application Priority Data

May 25, 1991 [JP] Japan .................. 3-149369

[51] Int. Cl.$^5$ ............................. H04N 5/76
[52] U.S. Cl. ...................... 369/59; 369/48; 369/32
[58] Field of Search .............. 369/32, 48, 54, 59, 369/13; 360/59

[56] References Cited

U.S. PATENT DOCUMENTS

| | | | |
|---|---|---|---|
| 5,109,369 | 4/1992 | Maeda et al. | 369/54 |
| 5,142,521 | 8/1992 | Terashima et al. | 369/32 |
| 5,148,419 | 9/1992 | Koguchi | 369/32 |

FOREIGN PATENT DOCUMENTS

0463183 1/1992 European Pat. Off. .

*Primary Examiner*—Robert J. Pascal
*Assistant Examiner*—Haissa Philogene
*Attorney, Agent, or Firm*—Limbach & Limbach

[57] ABSTRACT

A digital audio signal reproducing apparatus is provided in which, when reading out and reproducing compressed digital audio data recorded on an optical disc 2, readout from memory 22 is discontinued responsive to an input at a air-selecting and playback mode changeover key at a key input 8. If a repeat operation is commanded at the key input 8, silent data is written in memory 22 after the end of readout of the compressed data of the currently reproduced audio signals from the optical disc 2. In this manner, a muted state is produced instantaneously responsive to operation of the air selecting and playback mode changeover key. Also a muted state is introduced between airs in case of a repeat operation.

10 Claims, 8 Drawing Sheets

DIGITAL AUDIO SIGNAL REPRODUCING APPARATUS

BACKGROUND OF THE INVENTION

1. Field of the Invention

This invention relates to a digital audio signal reproducing apparatus in which compressed data of digital audio signals recorded on a recording medium is read out from the recording medium and written in a memory so as to be read out from the memory at a constant data rate.

2. Description of the Prior Art

The present Assignee has proposed a technique of bit compressing input digital audio signals and recording the data of a predetermined data volume as a recording unit in a burst-like manner.

With this technique, a magneto-optical disc is used as a recording medium for recording and/or reproducing adaptive differential (AD) PCM audio data as prescribed in e.g. CD-I (CD-Interactive) or CD-ROM XA audio data formats, or digital audio data encoded with bit compression in accordance with formats other than those given above. The bit-compressed digital audio data are recorded sector-sequentially and intermittently, that is, in a burst-like manner, with addition of linking sectors before and after each recording unit composed of a predetermined data volume, such as 32 sectors, for taking account of interleaving with the data of neighboring sectors.

Since the recording/play time approximately equal to that in the case of a standard 12 cm CD may be achieved with a disc of a smaller size, the apparatus may be reduced in size. On the other hand, by setting the instantaneous bit rate for recording/reproduction so as to be equal to that of the above-mentioned standard CD-DA format, the time necessary for recording/reproduction may be reduced to about ¼, so that the remaining ¾ of the time may be allocated to so-called retry or the like operations. These operations include a verification operation as to a recording which has been made regularly, or a rewriting operation in case of recording failure, as far as data recording is concerned, and the re-reading operation in case of a high data read error rate, as far as data reproduction is concerned. This system may be advantageously employed for a portable small-sized apparatus because recording/reproduction may be achieved more reliably even under adverse conditions of defocusing or detracking due to vibrations of the mechanical components caused by disturbances.

For recording/reproduction of digital audio data bit-compressed to ¼ of the original data, a buffer memory for recording/reproducing the compressed data is required. The compressed data are written continuously at a constant rate during recording and read out intermittently (in a burst fashion) at a rate about four times the write rate. The data volume read out intermittently each time is e.g. 32 sectors. As described above, several linking sectors are added before and after these 32 sectors and the resulting recording unit is recorded on the disc in spatial continuation to the preceding recording unit. During reproduction, the data volume of the above-mentioned recording unit, consisting of the 32 sectors and several linking sectors before and after the 32 sectors, is intermittently reproduced from the disc at a read-out rate about four times the write rate, and the linking sectors before and after the 32 sectors are removed before the data are written in the buffer memory. It is from this memory that the compressed data are read out continuously at the above-mentioned constant rate.

With a total storage capacity $M_T$ of the above-mentioned recording and/or reproducing buffer memory, the sum of the data volume of the compressed data written in and not read from the buffer memory (volume of non-read-out data) and the remaining storage capacity of the buffer memory, that is the volume of the data that can be written in the buffer memory without destructing the non-read-out data (volume of writable data), is equal to $M_T$. The following is an explanation of the controlling of data writing and read-out in or from the memory.

This controlling is so made that, during recording, the compressed data are written at a constant data rate into the buffer memory and, when the volume of the non-read-out data exceeds a predetermined volume $M_K$, data are read out in a burst-like manner by recording units each consisting of, for example, 32 sectors plus several sectors, at a readout rate faster than the data write rate, so as to be recorded on a recording medium, such as a disc. Data not recorded as yet on the recording medium represent the non-read-out data on the memory. If the recording on the recording medium is interrupted by disturbances, such as vibrations, or if recording has not been made normally, the volume of non-read-out data in the memory is not decreased, such that, if the volume of the non-read-out data is close to the total storage capacity $M_T$ of the memory, these non-read-out data may be destroyed by the compressed data written at a constant rate. In this consideration, recording on the recording medium is carried out under a condition in which the writable capacity in the buffer memory is below $(M_T - M_K)$, that is in which there is a certain allowance in the storage capacity of the writable area, so that destruction of the non-read-out data may be inhibited even in cases wherein recording on the recording medium is interrupted or is not carried out in a regular manner. It suffices to set $(M_T - M_K)$ so that a time interval which would be required for reversion to the state of recording on the recording medium from the state of recording interruption and for re-recording is presupposed and the operation of writing the compressed data on the memory may be continued during this presupposed time interval.

The controlling during reproduction is so made that, while the compressed data read out in a burst-like manner from the recording medium are written in the memory so as to be read at a constant data rate, the non-read-out data is read out from the recording medium in a burst-like manner so as to be written in the memory when the data volume of the non-read-out data becomes lesser than the predetermined data volume $M_L$. In this manner, even if data readout from the recording medium cannot be made in a regular manner due to disturbances or the like, the remaining data volume $M_L$ may be continuously read to prevent data reproduction from being interrupted due to interruption of the read-out operation at the constant rate. It suffices to set the non-read-out data volume $M_L$ so that the compressed data may be continuously read at the above-mentioned constant rate from the memory for a time required for re-reading the recording data from the recording medium.

Meanwhile, in a so-called CD (compact disc) player, there are frequently provided a pause function for transiently discontinuing the playback operation, an air selecting and reproducing function of selecting an air and reproducing the selected air, a one/all repeat function of repeatedly reproducing one or all of the airs of the disc, or an A/B repeat function of repeatedly reproducing from an arbitrary point A to another arbitrary point B, for making the best use of accessibility proper to the disc. By taking advantage of these functions, not only the operating labor may be dispensed with, but a more versatile domain of audio entertainment may be achieved.

If these functions are to be annexed to the recording-/reproducing apparatus or playback-only apparatus for compressed data as described above, a time lag is produced between the audio signals being reproduced and audio signals being read from the disc, due to the use of the buffer memory for reproduction, thus presenting response problems. On the other hand, if, in the case of repeating, the next air starts immediately to be reproduced on termination of the current air, the sound is continuous without interposition of a muted state, so that the hearer may feel disagreeable. Besides, a simplified arrangement for annexation of these functions is preferred.

SUMMARY OF THE INVENTION

In view of the above-described status of the art, it is an object of the present invention to provide a digital audio signal reproducing apparatus in which the function of selecting and reproducing desired airs or the repeat function may be realized without inconveniences by a simplified construction.

To this end, the present invention provides a digital audio signal reproducing apparatus for reproducing digital audio signals recorded on a recording medium with bit compression by reading out said digital audio signals and controlling writing and readout in or from said memory, characterized in that, responsive to a key input for carrying out accessing to the next playback position, readout from said memory is discontinued and the accessing to said next playback position is performed.

The present invention also provides a digital audio signal reproducing apparatus for reproducing digital audio signals recorded on a recording medium with bit compression by reading out said digital audio signals and controlling writing and readout in or from said memory, characterized in that, responsive to a key input for carrying out accessing to the next playback position on termination of readout from said recording medium of currently reproduced audio signals, silent data is written in said memory at a time point when the readout from said recording medium of said currently reproduced audio signals is terminated before accessing the said next playback position.

Typical of the key input for carrying out accessing to the next playback position is a key input for commanding the air-selecting and playback mode for designating the next air, current air or the preceding air or designating a desired air number by a number key. On the other hand, examples of the key input for carrying out accessing to the next playback position on termination of readout from said recording medium of currently reproduced audio signals, may include a key input for carrying out various repeat operations, program operating inputs for program reproduction and operating key inputs for random or shuffle reproduction.

In accordance with the digital audio signal reproducing apparatus according to the present invention, if a key input is made for accessing to the next playback position on termination of readout from the recording medium of the currently reproduced audio signals, such as for various repeat operations or program reproduction, silent data is written in the memory at the time point when readout from the recording medium of the currently reproduced audio signals is terminated, so that the muted state is presented before the start of the next reproducing operation in the playback audio signals read from the memory.

DESCRIPTION OF THE PREFERRED EMBODIMENTS

Figure 1:
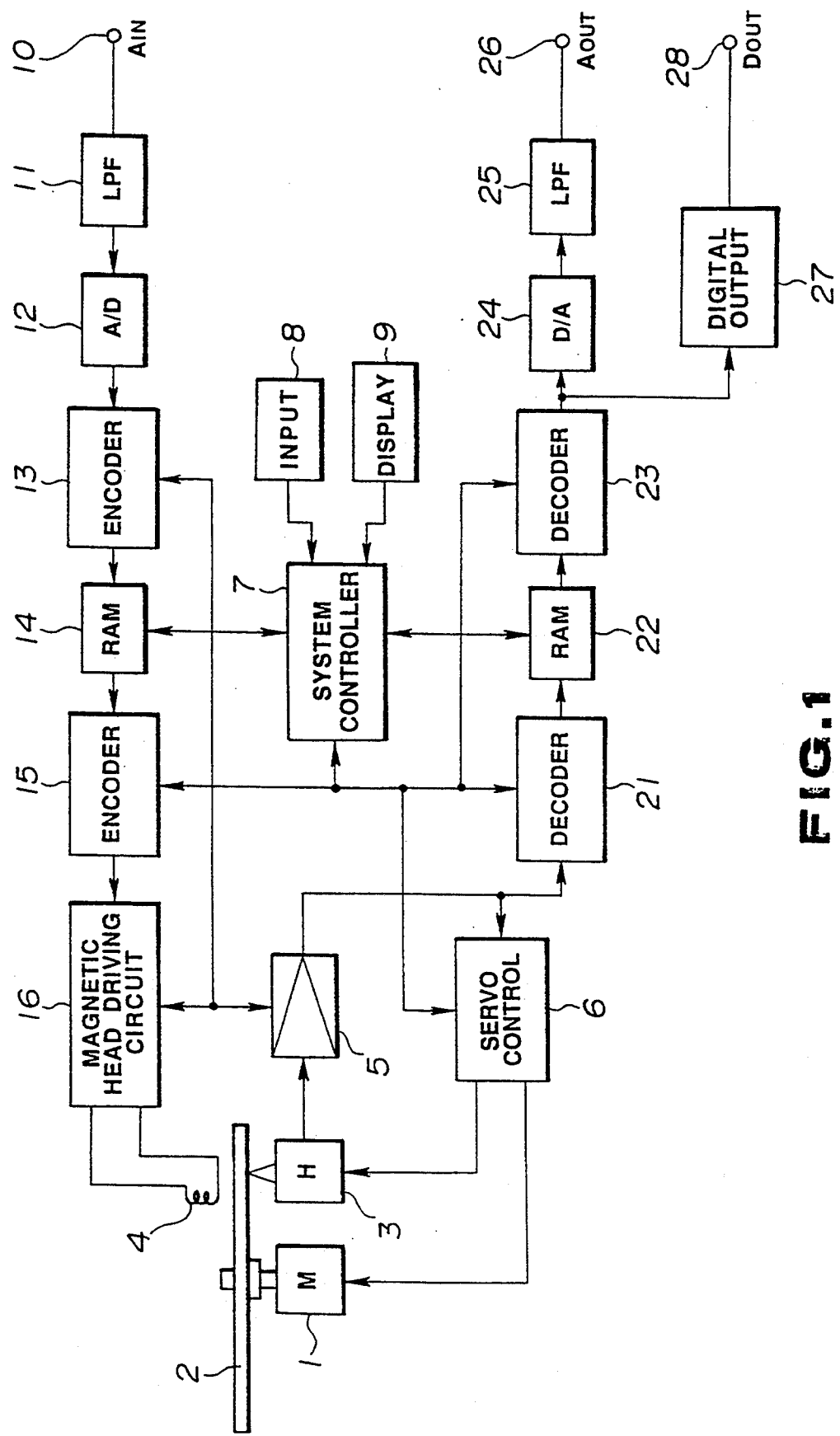
FIG. 1 is a block circuit diagram showing an illustrative arrangement of a compressed data recording/reproducing apparatus according to an embodiment of the present invention.

FIG. 1 shows, in a schematic block circuit diagram, a disc recording/reproducing apparatus as an embodiment of a digital audio signal reproducing apparatus according to the present invention.

In this figure, bit-compressed digital audio signals are recorded on a recording medium, such as an optical disc 2. These recording signals are read in a burst-like manner by predetermined recording units each consisting of, for example, 32 plus several sectors, to produce the bit-compressed audio data in a decoder 21 which is adapted for descrambling and error correction or decoding. These compressed data are written in a memory 22, such as a random access memory (RAM), from which the compressed data are read at a predetermined data rate and processed by a decoder 23 for bit expansion and decoding for reproducing audio signals.

Meanwhile, the controlling of the writing operation of the compressed data in memory 22 is so made that, when the data volume in memory 22 is less than a predetermined volume, the compressed data are read out from the recording medium, such as an optical disc 2, so as to be written in the memory 22, and the data are continuously read and written as long as there is a vacant area in memory 22 for data writing. If the vacant area becomes less than a predetermined value, so that data can no longer be written, that is when the memory is substantially devoid of vacant area, data read-out from the recording medium is discontinued. At this time, the optical head 3 may continue to trace the same track on the optical disc 2 or may remain at a standby state at the next reading position.

In the apparatus in which the writing in the memory 22 is controlled in the above-described manner, if the next air, current air or the preceding air is designated at a key input 8 or a desired air number is entered by pressing a number key etc. by way of commanding an air selection and playback mode, a system controller 7 resets the read pointer and the write pointer of the memory 22 to their initial states. These states correspond to no data storage in the memory 22 and no data is sent to the decoder 23 from the memory 22, so that the playback audio signals are in a muted state. However, if need be, D/A converter 24 or a low-pass filter 25 may be controlled to a muted state for muting the playback audio signals. The system controller 7 causes the optical head 3 to be moved to a leading track position of data of the designated air number on the optical disc 2 by means of a servo controlling circuit 6, by way of performing a head accessing control operation, and reads out recording data at this lead position after the end of accessing. The read-out data are written in the memory 22 and read out from the memory 22 so that an audio playback operation is performed from the leading end of the designated air. The above-mentioned muted state is naturally released during this playback operation.

If one/all repeat is commanded at the key input 8, the timing information concerning the compressed data read out from memory 22 is monitored for shifting to the air selection and playback mode operation on detection of the end of one or all airs on the disc. That is, the memory 22 is reset to its initial state, the leading position of one or all airs on the optical disc 2 is accessed and the recorded data starts to be read from this leading position, as in the case of the key input for designating the air selection and playback mode. When the audio signals start to be reproduced, the timing information concerning the one or all airs on the disc is again monitored for detecting the playback end time.

As another example of the repeat operation, the timing information of data which is being read from the recording medium, such as optical disc 2, so as to be written in the memory 22, is monitored, so that, at the time point when writing of the one or all airs is completed, the leading position of the one or all airs on the disc is accessed and the recorded data is read for continuous writing in the memory 22. Since the data are read out from memory 22 continuously, the leading end of an air is reproduced as soon as the reproduction of one or all airs is terminated, that is without interposition of a muted state, which would be disagreeable to the hearer. In this consideration, before the leading position of one or all airs on the disc is accessed for data writing in the memory 22, silent data continuing for e.g. several seconds is written in the memory 22 under control of the system controller 7 and the readout data from the leading end of the air is written in continuation to the silent data. In this manner, the leading part of an air is reproduced after reproducing the silent data for several seconds after the end of reproduction of the preceding air.

If point A designation and point B designation are inputted at the key input 8, the timing information concerning the compressed data read out from memory 22 is monitored and accessing is made to the point A after the playback has reached the point B. The ensuing operation is similar to the above-mentioned air selecting and reproducing operation, such that, when the playback is initiated, the timing information is again monitored for detecting the time point of reaching the point B.

As another example of the A/B repeat operation, the timing information of data being read out from the recording medium, such as the optical disc 2, so as to be written in the memory 22, may be monitored. If again the continuous playback without muted state during the repeat operation is disagreeable, after data readout as far as the point B on the recording medium, such as the optical disc 2, comes to an end, and before the point A is accessed to read out data, that is to write data in the memory 22, silent data continuing for e.g. several seconds is written in memory 22 so that the readout data from point A is written in continuation to the silent data. In this manner, when reverting from point B to the point A, the silent state continuing for several seconds is reproduced before the leading end of the air at the point A is reproduced.

The above-described repeat operation may be applied to a so-called program playback in which desired air numbers are programmed and sequentially reproduced, or to so-called shuffle or random playback in which airs are selected and reproduced at random. Meanwhile, there are two alternative methods for reading out data from the disc and writing the data in the memory. In a first method, a disc accessing operation is carried out after the end of the air reproduction as during the above-mentioned station selecting mode. In the second method, a disc accessing operation is carried out by monitoring the timing information at the stage of writing data in memory 22. If, in the latter case, a silent state is desired to be introduced at a linking part of two neighboring airs, silent data continuing for a predetermined time, such as several seconds, may be written after writing up to the end of the air read out from the recording medium and before writing from the leading end of the next air.

As described above, in the apparatus in which compressed data are read out intermittently from the recording medium, such as the optical disc 2, and written in the memory so as to be read out from the memory at a constant data rate for reproducing audio data, it is necessary to consider the manner of dealing with the compressed data written in the memory 22. That is, if, when a key input is made to command the air selection and reproduction, only the writing of data in memory 22 is discontinued and an accessing operation of accessing to the leading end of the next air, the data stored in the memory 22 continues to be read so that audio signals continue to be reproduced, the hearer may feel as if the response to the key input were retarded, which is not desirable. In this consideration, when the command for air selection and playback is made by a corresponding key input, the memory 22 is immediately reset to its initial state to discontinue the playback of the audio signals to realize the desired quick response. On the other hand, if a command is made for repeat playback, program playback or random (or shuffle) playback, the hearer may feel disagreeable by the absence of the muted state between the airs or during the return operation in the case of the repeat operation. For realizing this muted state, silent data continuing for a predetermined time, such as several seconds, is written in the memory 22 in continuation to the end of the air or to data at the terminal position of the repeat period. In this manner, a muted state corresponding to the period between airs or to the return operation in case of repeat operation is introduced in the reproduced signals to prevent the user from feeling disagreeable.

The concrete construction shown in FIG. 1 is hereinafter explained in detail.

An optical disc 2, rotationally driven by a spindle motor 1, may for example be a recordable disc, such as a magneto-optical disc. However, for a playback-only disc, an optical disc of an aluminum reflecting film type optical disc, similar to a conventional compact disc (CD), may be employed. An optical head 3 for recording/reproducing data on or from the optical disc which, in the following description, is a magneto-optical disc, is provided with a laser light source, such as a laser diode, optical components, such as a collimator lens, an object lens, a polarization beam splitter or a collimator lens and a photodetectors having light receiving parts of a predetermined pattern. The optical head 3 is provided facing the magnetic head 4 with the magneto-optical disc 2 in-between. For recording data on the magneto-optical disc 2, the magnetic head 4 is driven by a head driving circuit 16 of the recording system as later explained for impressing a magnetic field modulated in accordance with the recording data, whilst the laser light is radiated on a target track of the magneto-optical disc 2 by the optical head 3 for effecting thermomagnetic recording in accordance with the magnetic field modulation system. The optical head 13 also detects the laser light reflected back from the target track for detecting focusing errors and tracking errors by e.g. an astigmatic method and by the push-pull method, respectively. When reproducing data from the magneto-optical disc 2, the optical head 3 detects the focusing errors and the tracking errors, while detecting the difference in the deflection angle (Kerr rotation angle) of the reflected laser light from the target track for producing playback signals.

An output from the optical head 3 is supplied to an RF circuit 5. The RF circuit 5 extracts the focusing error signals and the tracking error signals from an output of the optical head 3 for supplying the extracted signals to a servo control circuit 6, while converting the reproduced signals into binary signals for supplying the produced binary signals to a decoder 21 of the reproducing system as later described.

The servo control circuit 6 includes a focusing servo circuit, a tracking servo circuit, a spindle motor servo control circuit and a thread servo control circuit. The focusing servo control circuit effects focusing servo control of the optical system of the optical head so that the focusing error signals will be reduced to zero. The tracking servo control circuit effects tracking servo control of the optical system of the optical head so that the tracking error signals will be reduced to zero. The spindle motor servo control circuit controls the spindle motor 1 for rotationally driving the magneto-optical disc 2 at a predetermined rotational velocity, such as at a predetermined linear velocity. The thread servo control circuit causes the optical head 3 and the magnetic head 4 to be displaced to a target track position of the magneto-optical disc 2 designated by system controller 6. The servo control circuit 6, performing these various controlling operations, transmit the information concerning the operating states of the components controlled by the servo control circuit 6 to system controller 7.

The key input 8 and a display 9 are connected to the system controller 7 controlling the recording system and the reproducing system under the operating mode designated by the input data by the key input 8. Among the functions achieved by the key operation, there are a pause function of transiently stopping the playback operation, the automatic air selecting function of selecting and reproducing the desired air, a one/all repeat function of repeatedly reproducing one or all airs of the disc and the A/B repeat function of repeatedly reproducing from a desired point A to another desired point B. The system controller 7 also supervises the recording position and the reproducing position on the recording track being traced by the optical head 3 and the magnetic head 4 based on the sector-by-sector address information reproduced by header time or sub-code Q-data from the recording track 2 of the magneto-optical disc 2. The information concerning the recording position or the playback position or the information concerning the function selected by the key operation is displayed, if need be, on the display 9.

The recording system of the disc recording/reproducing apparatus is hereinafter explained.

Analog audio input signals $A_{IN}$ from input terminal 10 are supplied via a low-pass filter 11 to an A/D converter 12. The A/D converter 12 quantizes the audio input signals $A_{IN}$ to produce digital audio signals which are supplied to an encoder 13 for high efficiency encoding, such as adaptive differential (AD) PCM. Digital audio signals from outside may also be supplied to the encoder 13 via a digital input interfacing circuit, now shown. The digital audio signals entered to the encoder 13 are non-compressed PCM data, that is so-called straight PCM data and, as a concrete example, PCM data having a sampling frequency of 44.1 kHz and the number of quantization bits of 16 bits, as in the case of the format for a standard compact disc (CD) format, or CD-DA format. The input audio PCM data are processed by encoder 13 by being subjected to high efficiency bit compression with approximately a ¼ bit rate.

The memory 14 is a buffer memory having data writing and readout controlled by system controller 7 and operated for transiently storing the bit-compressed data supplied from encoder 13 for subsequently recording on the disc as the occasion may demand. That is, in the above-mentioned ¼ bit compression mode, compressed data having the constant bit rate reduced to about ¼ of the standard data transfer rate (bit rate) is continuously written in memory 14. For recording the compressed data on the magneto-optical disc 2, the data are recorded in a burst-like manner at the same rotational velocity as that of the above-mentioned standard CD-DA format (constant linear velocity). That is, the time during which signals are actually recorded in the recording mode is about ¼ of the entire time, with the remaining ¾ time being the non-recording time. However, recording is made on the magneto-optical disc 2 in continuation to the region in which recording has been made immediately before the non-recording time, so that the recording is continuous on the medium surface. In this manner, recording is made with the same recording pattern and the same recording density as those of, for example, the standard CD-DA format.

In this manner, the compressed data are read in a burst-like manner from the memory 14 at a bit rate corresponding to the data transfer rate of the above-mentioned standard CD-DA format. The read-out compressed data are transmitted to an encoder 15 for interleaving, error correction coding or 8-to-14 modulation. In a data string supplied from memory 14 to encoder 15, a cluster composed of a predetermined number of sectors, such as 32 sectors, represent a recording unit. After encoding, several sectors for cluster connection are appended to the one-cluster data. These cluster-linking sectors are of a length longer than the interleaving length at the encoder 15, so that data of neighboring clusters may remain unaffected by interleaving.

The cluster-by-cluster recording will be explained later by referring to FIG. 2.

The recording data supplied from memory 14 in a burst-like manner as described above is processed in the encoder 15 by being subjected to encoding for error correction (parity appendage and interleaving) or EFM encoding. The recording data processed by the encoder 15 by being subjected to encoding is supplied to the magnetic head driving circuit 16. The magnetic head 4 is connected to the magnetic head driving circuit 16 and thereby driven for impressing the modulated magnetic field modulated in accordance with the recording data is on the magneto-optical disc 2.

The system controller 7, controlling the memory 14 in the above-described manner, controls the recording position for continuously recording the recording data read out in a burst-like manner from memory 14 on the recording track of the magento-optical disc 2. For controlling the recording position, the recording position of the recording data read out in a burst-like manner from the memory 14 is supervised by system controller 7 and a control signal designating the next recording position on the recording track of the magneto-optical disc is supplied to the servo control circuit 6.

The reproducing system of the disc recording/reproducing apparatus is hereinafter explained.

With the present reproducing system, adapted for reproducing the recording data continuously recorded on the recording track of the magneto-optical disc 2, the recording track of the magneto-optical disc 2 is traced by the optical head 3 with the laser light for reading the recording signals from the magneto-optical disc. Meanwhile, the magneto-optical disc 2 is rotationally driven at the same rotational velocity (constant linear velocity) as that of the standard CD-DA format. Thus the recording signals are read in a burst-like manner at the same data transfer rate as that of the standard CD-DA format and converted by RF amplifier circuit 5 before being supplied to the decoder 21.

The decoder 21 is a counterpart of the encoder 15 of the recording system and processes the playback output converted into the binary signals by the RF circuit 5 by subjecting it to deinterleaving, error correction decoding or 14-to-8 demodulation for outputting the above-mentioned $\frac{1}{4}$ compressed data in a burst-like manner at the data transfer rate which is the same as that of the standard CD-DA format. Meanwhile, the playback data produced by decoder 21 are supplied to a memory 22.

The system controller 7 controls data writing and readout in or from the memory 22, in which the playback data supplied from decoder 21 in a burst-like manner at the same data transfer rate as that of the above-mentioned CD-DA format is recorded. The playback data written in the burst-like manner in the memory 22 are read out continuously at a constant bit rate, that is at a data transfer rate approximately equal to $\frac{1}{4}$ of that of the above-mentioned CD-DA format.

The system controller 7, controlling the writing/readout of the reproduced data in or from memory 22 as described above, also controls the playback position so that the above-mentioned playback data written in the burst-like manner from memory 22 under control of the system controller 7 may be continuously reproduced from the recording track of the magneto-optical disc 2. For controlling the reproducing position in this manner, the playback position of the playback data read out in the burst-like manner from memory 22 is supervised by system controller 7 and a control signal designating the next reproducing position on the recording track of the magneto-optical disc 2 is supplied to the servo control circuit 6.

The compressed data, obtained as playback data continuously read out from memory 22 at the above-mentioned transfer rate (bit rate) approximately equal to one-fourth of the standard bit rate, is supplied to a decoder 23. The decoder 23 is a counterpart of the encoder 13 of the recording system and reproduces 16-bit digital audio data by data expansion (bit expansion) to four times of the $\frac{1}{4}$ compressed data. The digital audio data from decoder 23 is supplied to a D/A converter 24.

The D/A converter 24 converts the digital audio data, supplied from decoder 23, into analog signals, so that analog audio output signals $A_{OUT}$ are outputted via low-pass filter 25 at an output terminal 26.

Meanwhile, the magneto-optical disc 2, employed for the above-described disc recording/reproducing apparatus, is preferably of a capacity capable of recording 60 to 74 minutes of stereo audio signals. With the above-mentioned $\frac{1}{4}$ data compression rate, the disc capacity on the order of 130 Mbytes are required. The disc is preferably of an outer diameter of 8 cm or less for use in a portable or pocket size recording and/or reproducing apparatus. As for the track pitch and the linear velocity, the track pitch of 1.6 μm and the linear velocity of 1.2 to 1.4 m/s, which are the same as those of the compact disc, are desired. A disc satisfying these requirements is preferably of an outer diameter of 64 mm, an outer diameter of a data recording region of 61 mm, an inner diameter of the data recording region of 28 mm and a center hole diameter of 11 mm. If such disc is accommodated in a disc caddy of a 68 mm × 72 mm and marketed in this state, recording and/or reproduction on or from the disc may be made with a pocket size recording/reproducing apparatus. As for the ranges of the inner and outer diameters of the disc recording region of the disc with which recording and/or reproduction for 72 to 76 minutes under the $\frac{1}{4}$ data compression mode, the outer diameter may be in the range of from 60 to 62 mm for the inner diameter of 31 mm and in the range of from 71 to 73 mm for the inner diameter of 50 mm.

The basic recording/reproducing operation by the above described disc recording/reproducing apparatus is explained in detail.

The recording data, that is data read out from memory 14, is arranged into clusters or blocks each composed of a predetermined number of, e.g. 32, sectors, and several, e.g. four, linking sectors L1 to L4. For recording a cluster, e.g. the K'th cluster, not only the 32 sectors B0 to B31 for the cluster $C_k$, but three leading sectors and one trailing sector, that is, two run-in block sectors L2, L3 and one sector for sub-data L4 towards the cluster $C_{k-1}$ and one run-out block sector L1, towards the cluster $C_{k+1}$, totalling 36 sectors, are recorded as a unit. These 36 sector recording data are transmitted from memory 14 to encoder 15 and there interleaved so that data are scrambled over a distance of 108 frames corresponding to about 1.1 sector at the maximum. Thus the data within the cluster $C_k$ are confined within the range of the linking sectors L1 to L4 without affecting the other clusters $C_{k-1}$ or $C_{k+1}$.

Meanwhile, dummy data such as 0s, are arranged in the sectors L1 to L3, while subsidiary data or sub-data are arranged in the sector L4, for avoiding adverse effects on main data otherwise caused by interleaving. Sector numbers with 8-bit binary numbers (2-place hectadecimal numbers) of 0000 0000 (00H) to 0001 1111 (1FH) are affixed to main data sectors B0 to B31, a sector number 0010 0000 (20H) is affixed to the linking sector L1 and sector numbers 0011 1101 (3DH) to 0011 1111 (3FH) are affixed to L2 to L4. Meanwhile, 36 sectors, inclusive of the linking sectors, may be arranged into one cluster.

By recording on the cluster-by-cluster basis, there is no necessity of taking account of interference with other clusters due to interleaving, so that data processing may be simplified significantly. Besides, if recording data cannot be recorded in a regular manner during recording, due to e.g. defocusing, detracking or the like malfunctions, re-recording may be carried out on the cluster-by-cluster basis. On the other hand, if data reading cannot be made effectively during reproduction, re-reading may be made on the cluster-by-cluster basis.

Meanwhile, each sector or block consists of 2352 bytes, of which 12 synchronization bytes, 4 header bytes and 2336 bytes as data D0001 to D2336 are arrayed in this order starting from the leading end. The 12 synchronization bytes in the sector array (block array) start with the first byte 00H, H denoting a hexagonal number, followed by 10 bytes FFH, followed in turn by the last one byte 00H. The next 4 header bytes consist of address parts for minute, second and block, each consisting of 1 byte, and one byte for mode information. The mode information is mainly used for indicating the CD-ROM modes and the inner structure of the sector shown in FIG. 2 corresponds to mode 2 of the CD-ROM format.

CD-I is a standard making use of this mode 2.

Figure 2:
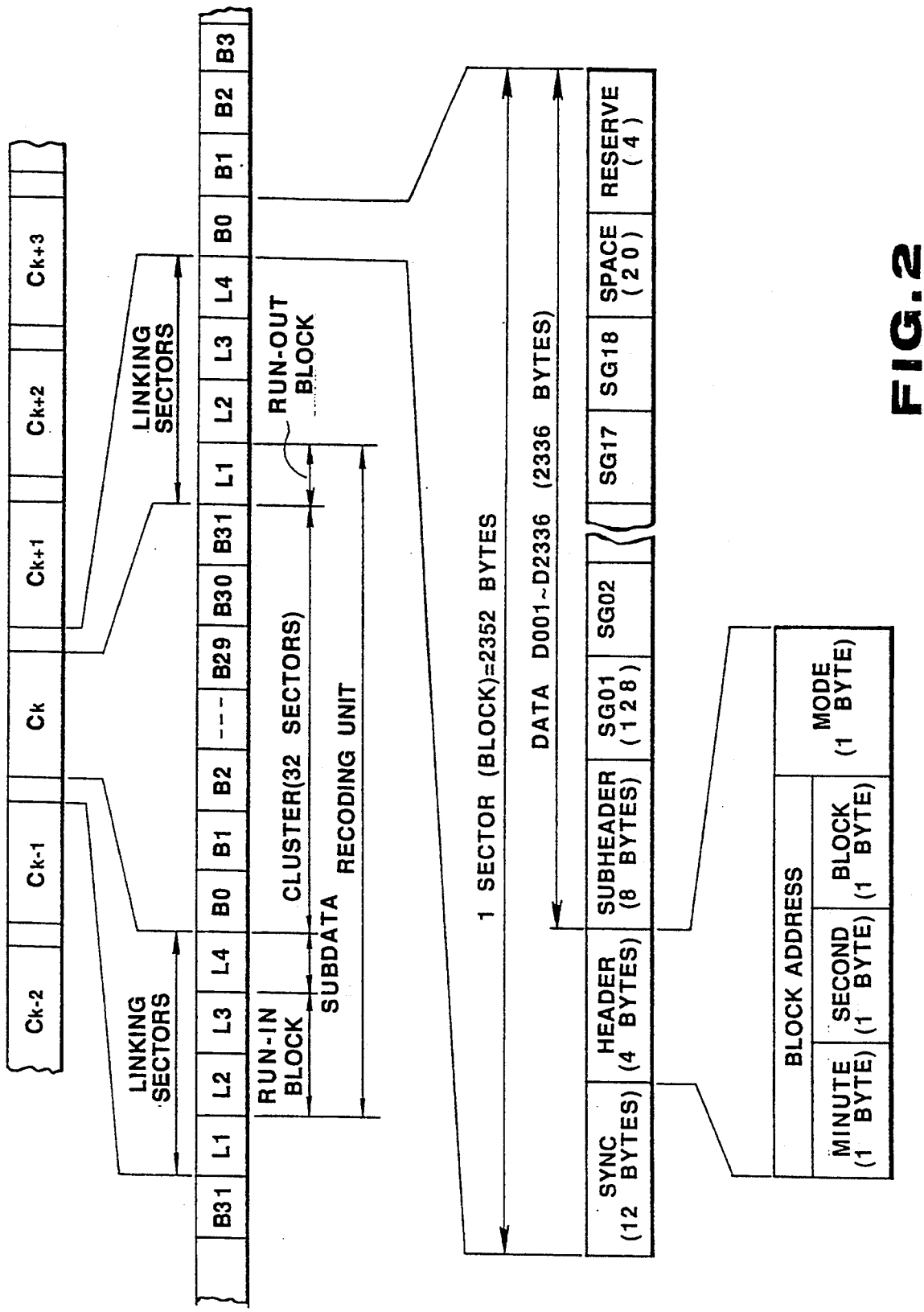
FIG. 2 shows a format of a cluster as a recording unit for recording on a recording medium.

In the concrete example, shown in FIG. 2, the format for recording the compressed audio data is shown, which is an area of the 2336 bytes, consisting of 8-byte sub-headers, 18 sound groups SG01 to SG18 each consisting of 128 bytes, 20 bytes of a space area and a 4-byte reserve area. The 8-byte subheaders are made up of two arrays each consisting of a 1-byte file number, a 1-byte channel number, 1-byte sub-mode and 1-byte data type.

Figure 3:
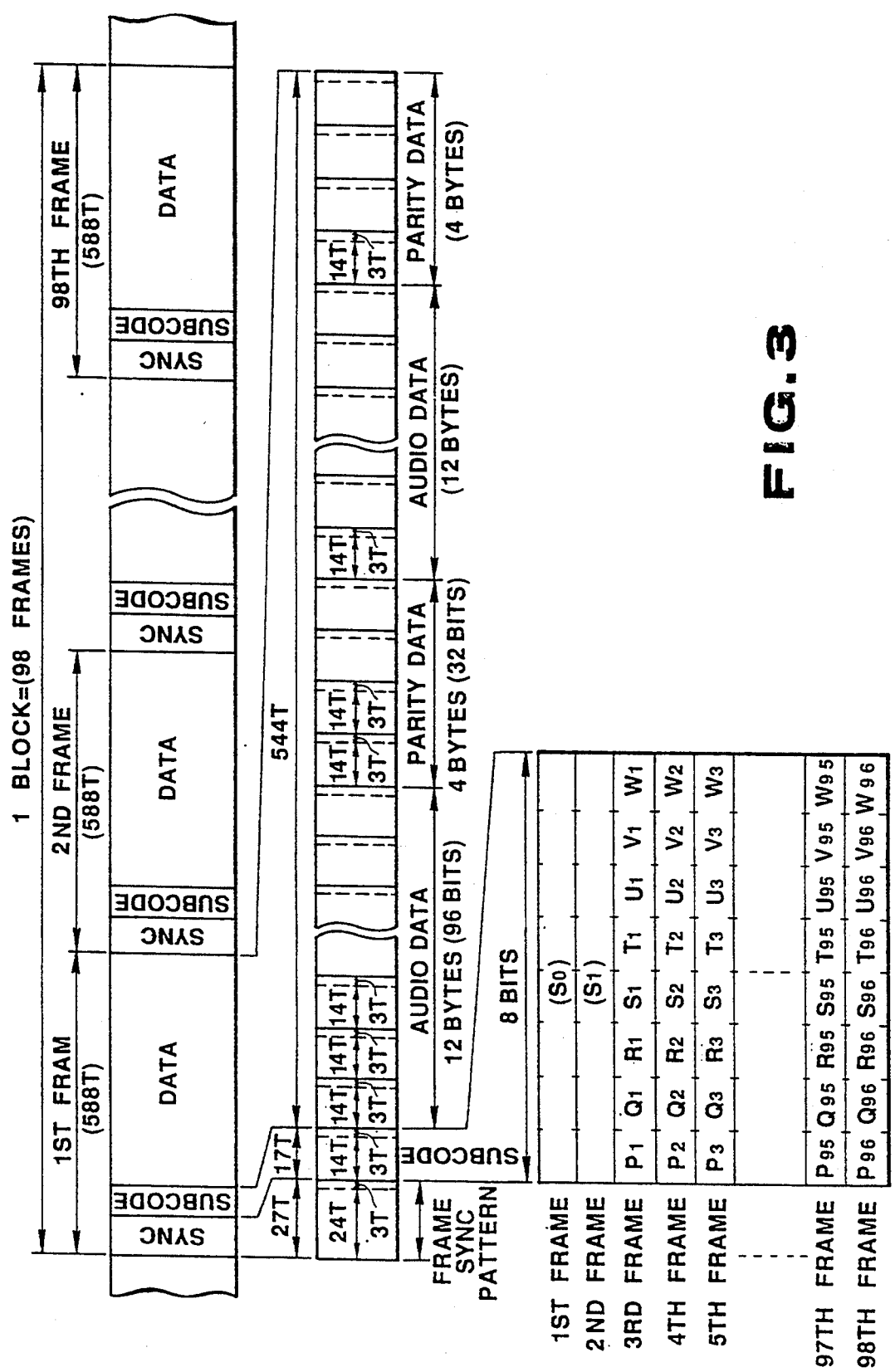
FIG. 3 shows a format showing a sector (block) and sectors in a CD standard.
Figure 4:
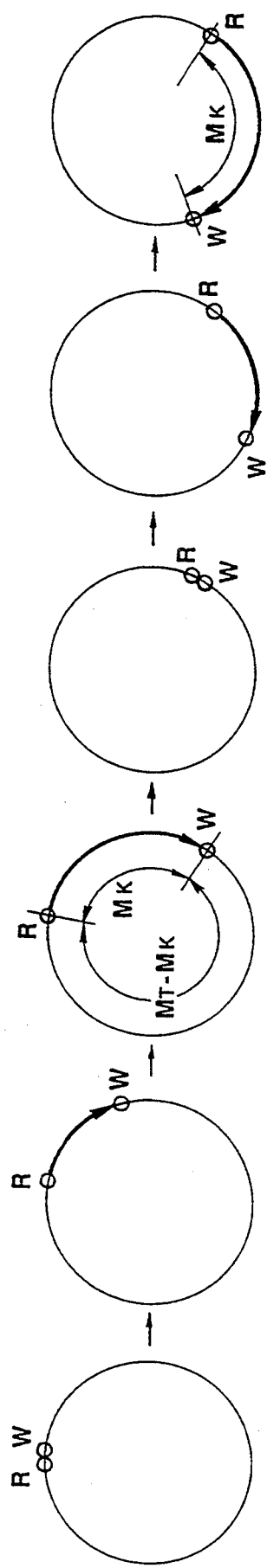
FIG. 4 shows the memory controlling state in a recording system of the disc recording/reproducing system shown in FIG. 1.

Meanwhile, when the sector array data are recorded on the disc, the data are processed by the encoder by being subjected to parity appendage, interleaving and 8-to-14 modulation for performing a recording in accordance with the recording format shown in FIG. 3.

In this figure, one block or sector is made up of 98 frames of first to 98th frames, each frame being 588 times a channel clock period T or 588T. In each frame, there are a frame synchronization pattern of 24T (plus 3 linking bits 3T), a subcode of 14T (plus 3 linking bits) and main data (audio data and parity data) of 544T. These 544T main data are composed of 12 bytes (12 symbols) of audio data, 4 bytes of parity data, 12 bytes of audio data and 4 bytes of parity data, processed by being subjected to so-called eight-to-fourteen (EFM) modulation. The audio data in each frame are 24 bytes or 12 words (it being noted that one word of the audio sample data consist of 16 bits). The sub-code is produced by EFM of the 8-bit subcode data. The subcode is arrayed in one block consisting of 98 frames, with the respective bits constituting 8 subcode channels P to W. The first and second frames of the subcode are of synchronization patterns $S_0$, $S_1$ violating the EFM rule, with the subcode channels P to W being composed of 96 bits of from the third to the 98th frames.

The above-mentioned audio data are re-recorded after interleaving. During reproduction, the interleaved data are deinterleaved for providing audio data of a data array conforming to the chronological sequence. Instead of these audio data, usual CD-I data may also be recorded.

Meanwhile, in the above-described disc recording-/reproducing apparatus, system controller 7 continuously increments a write pointer W of the memory 14 at a rate conforming to the bit rate of the compressed data to write the compressed data continuously. When the non-read-out data of the compressed data exceeds a predetermined volume $M_k$, system controller 7 increments a read pointer R of the memory 14 in a burst-like manner at a transfer rate conforming to the above-mentioned standard CD—DA format for reading out the compressed data with a predetermined data volume, such as 32 consecutive sectors, as a recording unit. In this manner, it becomes possible to prevent the data volume that can be written without destructing the non-read-out data, that is the recordable data volume, from becoming lower than the predetermined volume $(M_T - M_K)$.

It is noted that the recording data, read out in a burst-like manner from memory 14, may be recorded in a continuous state on the recording track of the magneto-optical disc 2, by controlling the recording position on the recording track of the magneto-optical disc 2. Besides, since a data writing area in excess of a predetermined volume is maintained at all times in the memory 14, input data may be continuously written in the recordable area in excess of the predetermined volume, even although the occurrence of a track jump etc. due to disturbances is detected by the system controller 7 to interrupt the recording operation on the magneto-optical disc 2. In this case, a resetting operation may be undertaken in the interim, so that input data can be recorded continuously.

Figure 6:
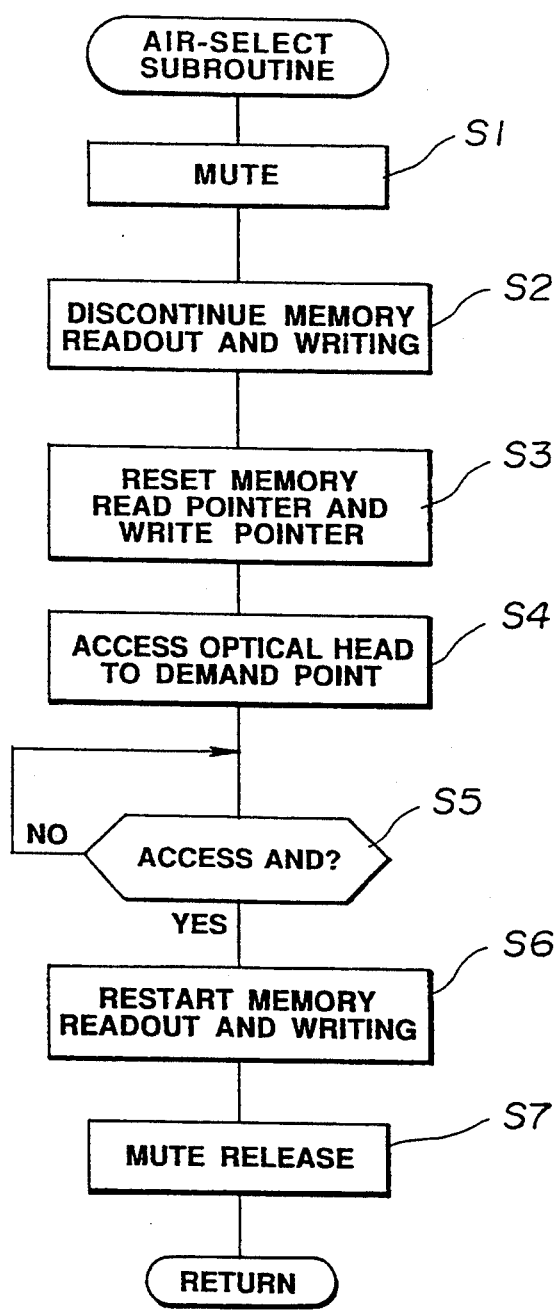
FIG. 6 is a flow chart showing a concrete example of an air-selecting and reproducing operation.

A concrete control operation by system controller 7 in case of a key input operation of designating the so-called air selecting and reproducing mode by designating the next air, the current air or the preceding air by the key input 8 or by designating a desired air number by a number key etc. is explained by referring to FIG. 6.

Figure 5:
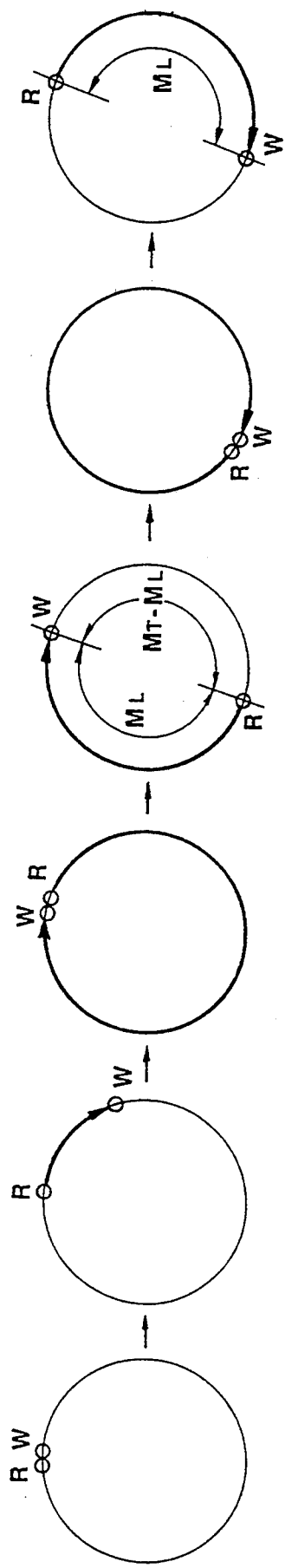
FIG. 5 shows the memory controlling state in a reproducing system of the disc recording/reproducing system shown in FIG. 1.

If the key entry operation is made for designating the so-called air selection and playback mode, muting is first carried out, as shown at step S1 in FIG. 6. Thus the D/A converter 24 or the low-pass filter 25 is muted to render the playback audio silent. At step S2, readout or writing from or in the memory 22 is discontinued. At step S3, the read pointer R and the write pointer W are reset to initial states. This state is the state shown at the left hand end of FIG. 5, in which the read pointer R and the write pointer W are situated at the same address and no data is stored in memory 22. Since no data is supplied at this time from memory 22 to decoder 23, the playback audio signals are naturally in the muted state. However, the muted state is achieved in the present example at step S1. Control proceeds then to step S4 at which system controller 7 causes the optical head 3 to be moved, by means of servo circuit 6, to a required point, that is to the leading track position of data of the designated air number on the magneto-optical disc 2, by way of a head accessing operation. At the next step S5, it is checked if the accessing operation is terminated, that is if the magnetic head has reached the target position. If the result is negative, control reverts to step S5. If the result of check at step S5 is affirmative, that is if the accessing is terminated, control proceeds to step S6 to start readout from the accessed position of the disc 2, that is the leading end of the air data of the designated air number, as well as to re-initiate writing of read-out data and data readout in or from the memory 22. At the next step S7, the muting applied at step S1 is released to return to the main routine. Thus the audio playback operation is carried out from the leading end of the designated air.

Figure 7:
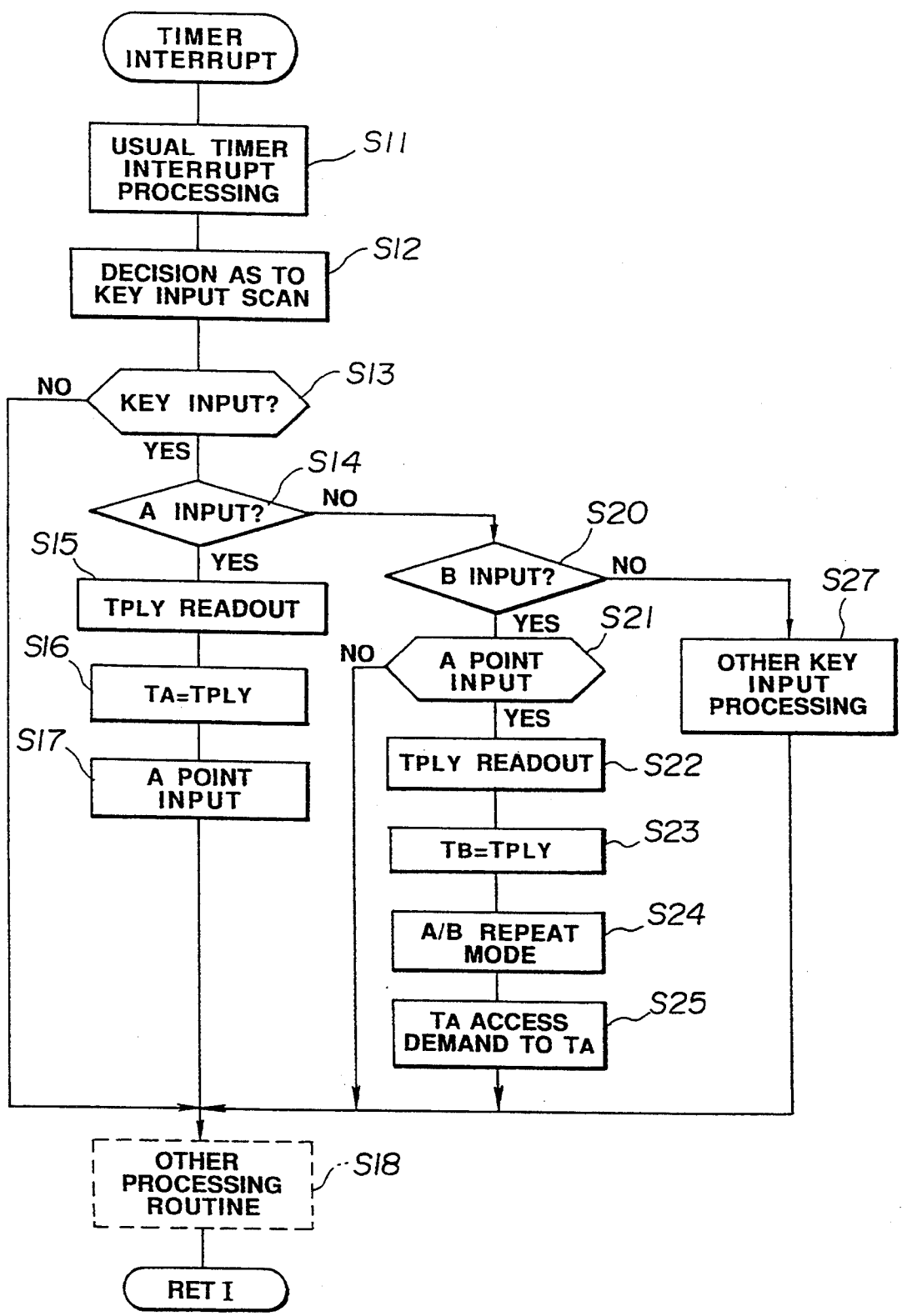
FIG. 7 is a flow chart showing a concrete example of an A/B repeat operation.

FIG. 7 is a flow chart showing a concrete example of the operation of the so-called A/B repeat operation, that is the repeated playback from the designated point A to the designated point B.

Referring to FIG. 7, a key input operation is adapted to take place in the course of a timer interrupt routine. If this timer interrupt occurs, a usual timer interrupt processing is carried out at step S11, after which the operations of a key input scan and a key input decision is performed at step S12. At the next step S13, it is checked if the key input has been made. If the result in negative, control skips to step S18 for other processing operations. If the result of step S13 is affirmative, that is if it is found that a key input has been made, it is checked at step S14 if the input is at the point A. If the result is affirmative, control proceeds to step S15 to read out the timing information, such as time codes $T_{PLY}$ concerning audio signals read out from memory 22 and currently reproduced. The timing information $T_{PLY}$ is stored at step S16 in a variable $T_A$ indicating the position A ($T_A = T_{PLY}$) and a flag indicating that the input has been made for point A is set at step S17. After the other processing routine is performed at step S18, the timer interrupt routine (RET 1) is carried out.

If the result at step S14 is negative, that is, if it is found that the input is not for point A, control proceeds to step S20 to check if the input is for point B. If the result is affirmative, control proceeds to step S21 to check if the input for point A has been made, for example, if the flag indicating the input for point A has been set. If the result at step S21 is negative, control reverts to step S18. If the result at step S21 is affirmative, control proceeds to step S22. At step S22, the timing information $T_{PLY}$ of the audio signals read out from memory and currently reproduced is read out and stored at step S23 in a variable $T_B$ indicating the position of the point B ($T_B = T_{PLY}$). At step S24, a flag indicating that the A/B repeat mode, for example, has now been initiated, is set. At step S25, after an access request to the position of the point A is made, control proceeds to step S18. At step S18, the routine for other processing operations is executed before the timer interrupt routine or return (RET 1) is carried out.

If the result of step S20 is negative, that is if it is found at step S20 that the input is not for point B, control proceeds to step S27 for executing other key input processing operations before control proceeds to step S18.

Figure 8:
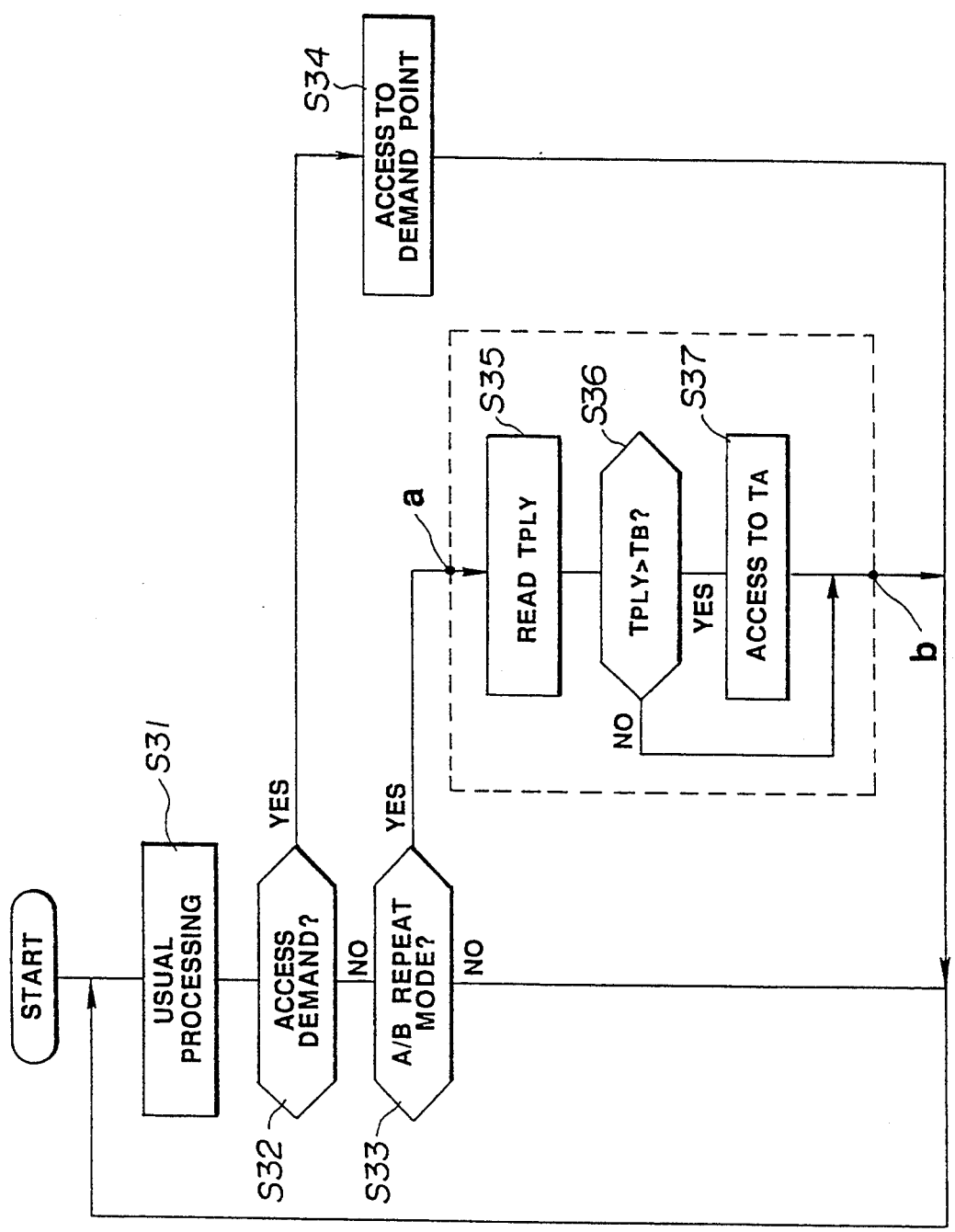
FIG. 8 is a flow chart showing a portion of a main routine concerning the A/B repeat operation.

FIG. 8 is a flow chart showing the operation of main parts concerning the above-mentioned A/B repeat operation in the main routine.

Referring to FIG. 8, usual processing of the main routine is carried out a step S31 and, at step S32, it is judged if a request for accessing has been made. If the result of decision at step S32 is affirmative, that is if it is found that a demand for access has been made, control proceeds to step S34 to access the point of demand before control reverts to step S31. If the result of decision at step S32 is negative, that is if it is found that access has not been demanded, control proceeds to step S33 to check if there prevails the A/B repeat mode. If the result of decision is negative, control reverts to step S31. If the result of decision at step S33 is affirmative, that is if a flag indicating the A/B repeat mode is set, control proceeds to step S35 to read out the timing information, such as time codes $T_{PLY}$, for the audio signals read out from memory 22 and reproduced currently. At the next step S36, it is checked if the read-out timing information $T_{PLY}$ exceeded the position of the point $T_B$, that is if $T_{PLY} > T_B$. If the result of decision is negative, control reverts to step S31 and, if the result is affirmative, that is if $T_{PLY} > T_B$, control proceeds to step S37. At step S37, the position of the point A is accessed before control reverts to step S31.

FIG. 8 shows the example of performing access control based on the timing information $T_{PLY}$ of data read out from memory 22. Alternatively, access control may also be made based on the timing information of data which is read out from the magneto-optical disc 2 so as to be written in memory 22. This timing information is referred to herein as $T_{PUP}$. This may be realized by substituting a flow chart shown in FIG. 9 for a portion from point a to point b in FIG. 8 (the portion surrounded by a broken line in FIG. 8). That is, if the result of decision at step S33 is affirmative for the A/B repeat mode, it is only necessary for control to proceed to the first step S41 in FIG. 9.

Figure 9:
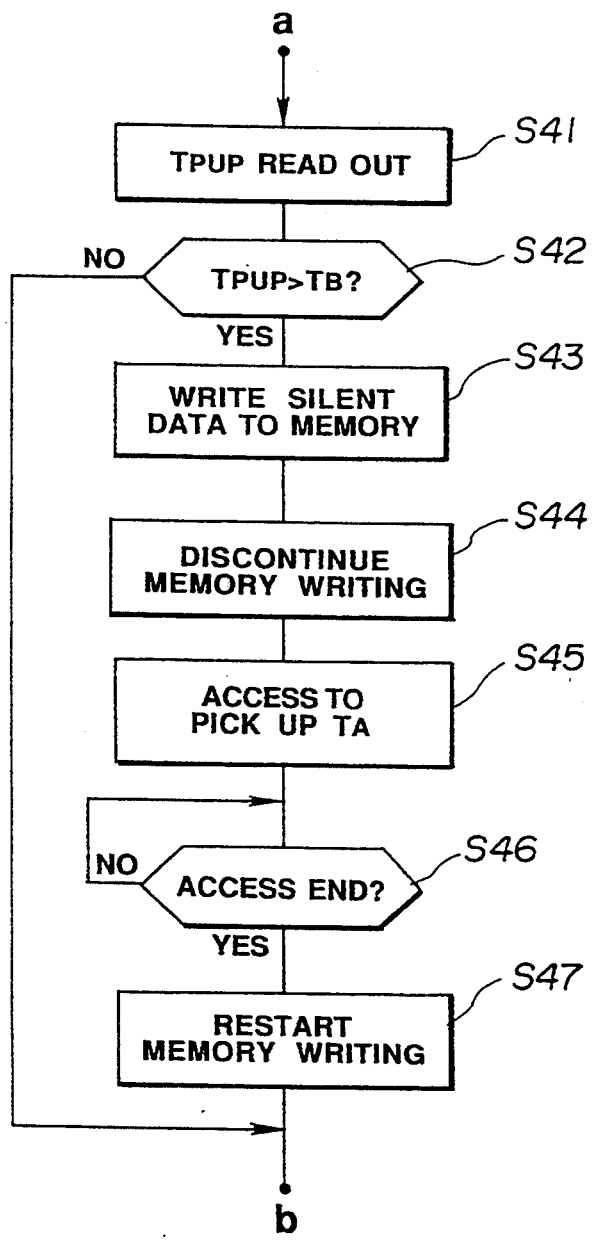
FIG. 9 is a flow chart showing a concrete example of a modified portion of the flow chart of FIG. 8.

In FIG. 9, the timing information $T_{PUP}$ read out from the magneto-optical disc 2 and written in memory 22 is read at step S41, as explained above. At the next step S42, it is checked if the timing information $T_{PUP}$ exceeded the position of the point B ($T_{PUP} > T_B$) and, if the result is negative, control reverts to step S31 via a point b. If the result of decision at step S42 is affirmative, that is if it is found that $T_{PUP}$ exceeded $T_B$, control proceeds to step S43 to write silent data continuing for a predetermined time of e.g. several seconds in memory 22. At step S44, writing in memory 22 is discontinued and control then proceeds to step S43 to effect accessing control of the optical head 3 to the position $T_A$ of the point A. At step S46, it is determined if the accessing is terminated. If the result is negative, control reverts to step S46 and, if the result is affirmative, control proceeds to step S47. At step S47, data readout from the magneto-optical disc 2 is re-initiated at the same time that control reverts to step S31 of FIG. 8 via point b at which writing in memory 22 has been re-initiated.

It will be seen from the above description that the present invention provides a digital audio signal reproducing apparatus for reproducing digital audio data at a constant data rate by reading digital audio signals recorded on a recording medium after bit compression, in which readout from memory is discontinued and accessing to the next playback position is carried out responsive to a key input for carrying out accessing to the next playback position such as by designating the next air, current air or the preceding air or designating the desired air number by means of a number key etc., so that, when a key input designating the accessing to the next playback position, such a input at a changeover key to an air selecting and playback mode, is made, readout from memory is discontinued and playback audio signals are muted immediately with good responsive characteristics.

On the other hand, silent data is written in the memory at a time point when readout from the recording medium of the currently reproduced audio signals is terminated, responsive to a key input for carrying out accessing to the next playback position on termination or readout from the recording medium of the currently reproduced audio signals. Since the muted state is interposed in this manner between airs or during repeat return operation, no disagreeable feeling is imparted to the hearer.

The present invention is not limited to the above-described embodiments, but may comprise various modifications within the scope of the invention. For example, the disc-shaped recording medium may also be a magnetic disc, instead of an optical disc or a magneto-optical disc, while recorded data may be those other than the compressed data.

What is claimed is:

1. An apparatus for reproducing audio signals digitally recorded on a disc shaped recording medium comprising:

driving means for rotating a disc shaped recording medium;

reading means for reading in bursts from the recording medium digitally recorded audio signals, the reading means generating at a first transfer rate playback data corresponding to the digitally recorded audio signals;

memory means for sequentially storing the playback data;

readout means for sequentially reading at a second transfer rate playback data stored in the memory means, the second transfer rate less than the first transfer rate;

playback control means operative to cause the reading means to generate playback data when the volume of playback data stored in the memory means is less than a predetermined volume;

selection input means for generating access data representative of selected digitally recorded audio signals; and control means operative, in response to access data representative of newly selected digitally recorded audio signals, to terminate reading by the reading means of the digitally encoded audio signals from a first location of the recording medium, to delete playback data read from the first location and stored within the memory means, to sequentially store within the memory means data representative of substantially silent audio signals, and to commence reading by the reading means of digitally encoded audio signals from a second location of the recording medium, the second location corresponding to the newly selected digitally recorded audio signals.

2. The apparatus for reproducing audio signals of claim 1 wherein the disc shaped recording medium comprises:

a magneto-optical disk.

3. The apparatus for reproducing audio signals of claim 1 wherein the selection input means further comprises:

a plurality of keys.

4. The apparatus for reproducing audio signals of claim 1 wherein the control means, upon sensing undecodable playback data, resets the reading means to re-read a portion of the recording medium corresponding to the undecodable playback data.

5. The apparatus for reproducing audio signals of claim 4 wherein the predetermined volume of playback data corresponds to a playback time interval in excess of a time interval for resetting the reading means.

6. An apparatus for reproducing audio signals digitally recorded on a disc shaped recording medium comprising:

driving means for rotating a disc shaped recording medium;

reading means for reading in bursts from the recording medium digitally recorded audio signals, the reading means generating at a first transfer rate playback data corresponding to the digitally recorded audio signals;

memory means for sequentially storing the playback data;

readout means for sequentially reading at a second transfer rate playback data stored in the memory means, the second transfer rate less than the first transfer rate;

playback control means to operative to cause the reading means to generate playback data when the volume of playback data stored in the memory means is less than a predetermined volume;

selection input means for generating access data representative of selected digitally recorded audio signals; and control means operative, in response to access data representative of a selection of repeated digitally recorded audio signals, to sequentially store within the memory means, between playback data representative of each repeat of digitally recorded audio signals, data representative of substantially silent audio signals.

7. The apparatus for reproducing audio signals of claim 6 wherein the disc shaped recording medium further comprises:

a magneto-optical disk.

8. The apparatus for reproducing audio signals of claim 6 wherein the selection input means further comprises:

a plurality of keys.

9. The apparatus for reproducing audio signals of claim 6 wherein the control means, upon sensing undecodable playback data, resets the reading means to re-read a portion of the recording medium corresponding to the undecodable playback data.

10. The apparatus for reproducing audio signals of claim 9 wherein the predetermined volume of playback data corresponds to a playback time interval in excess of a time interval for resetting the reading means.

* * * * *